Aug. 12, 1947.    C. B. LIVERS    2,425,380
SELECTOR VALVE MECHANISM
Filed June 19, 1943    4 Sheets-Sheet 2

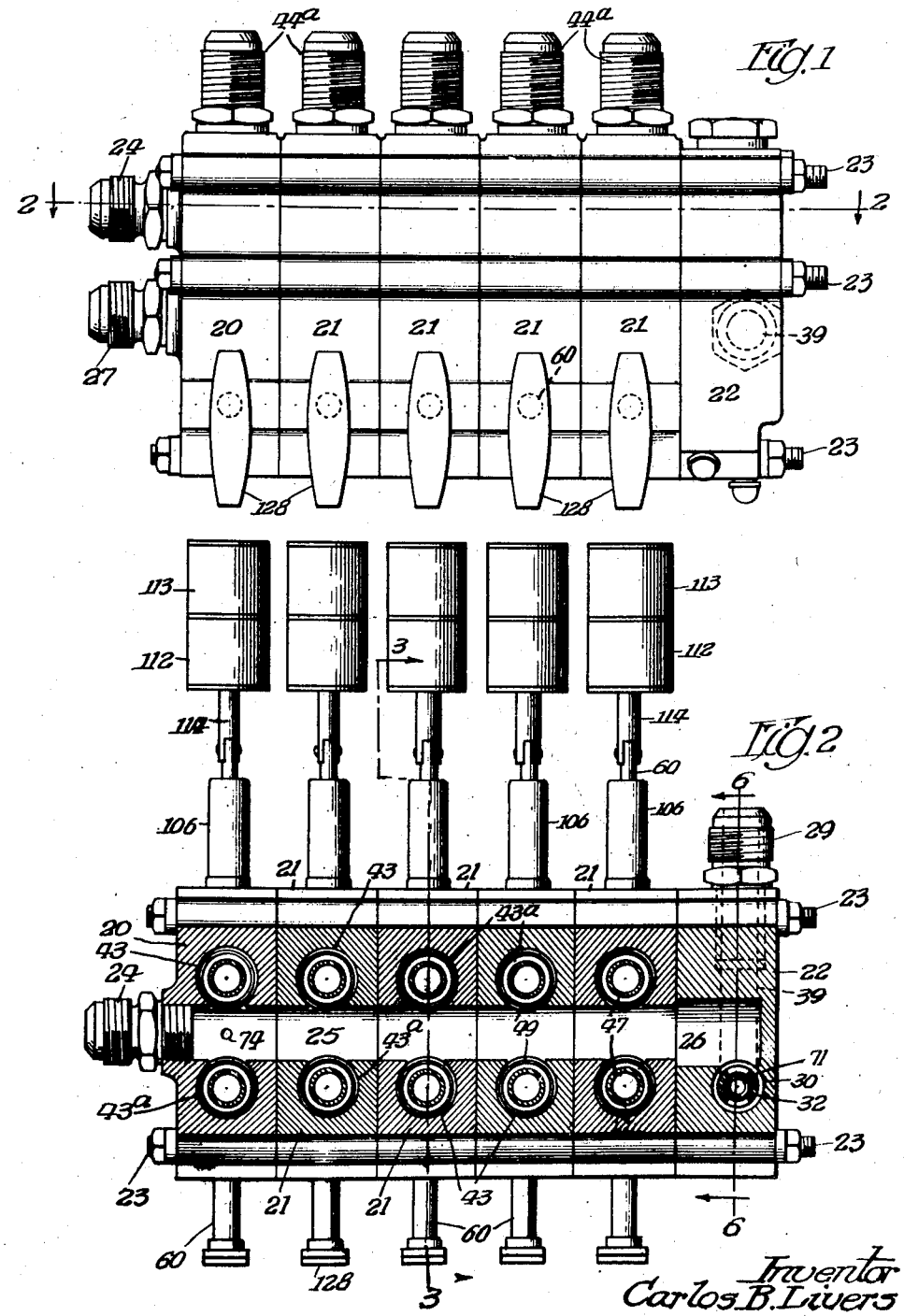

Inventor
Carlos B. Livers
By Fred Gerlach
his Atty

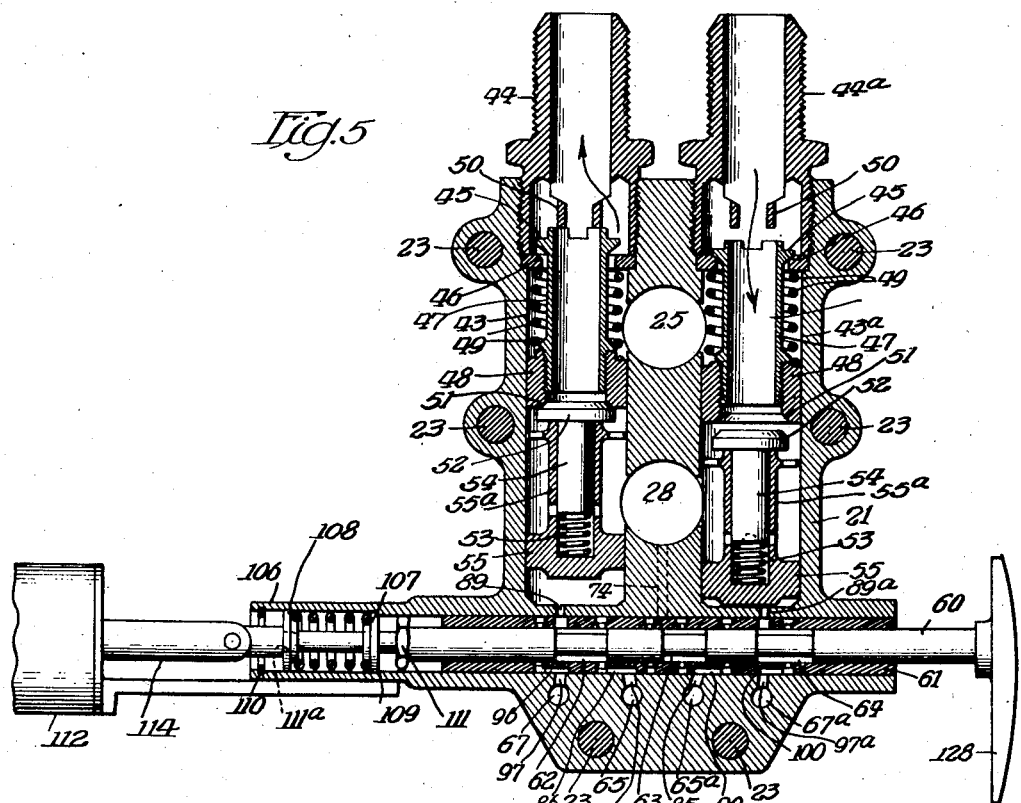

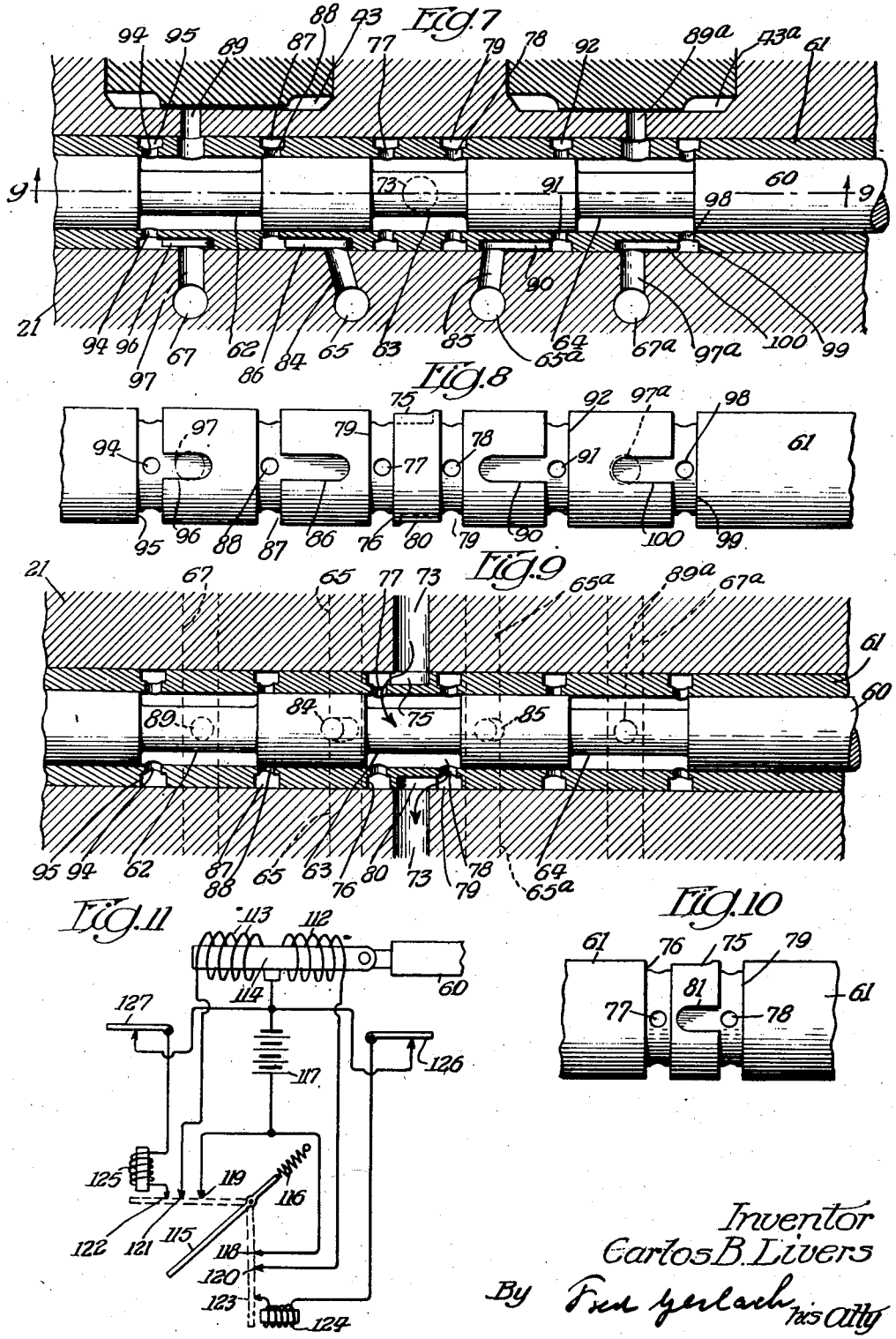

Patented Aug. 12, 1947

2,425,380

UNITED STATES PATENT OFFICE 2,425,380

SELECTOR VALVE MECHANISM

Carlos B. Livers, San Diego, Calif., assignor to Consolidated Vultee Aircraft Corporation, San Diego, Calif., a corporation of Delaware Application June 19, 1943, Serial No. 491,430

2 Claims. (Cl. 137—144)

The invention relates to valve mechanism for selectively controlling the two-way operation of hydraulically operable systems or devices and is adapted more particularly for use in aircraft in which such systems or devices are used for raising and lowering the landing gear, opening and closing bomb-bay doors, extending and retracting landing flaps, and for other purposes.

The several objects of the invention are to provide an improved selectively controllable valve mechanism: which is constructed and arranged so that any leakage past the valves in one unit of the selector mechanism cannot cause malfunctioning of the valves of another unit; which vents off or exhausts the fluid through a return valve in the selector mechanism, when thermal expansion causes the fluid in the lines between the selector mechanism and the operated devices to volumetrically increase; in which each control member is automatically returned to neutral position as soon as the hydraulically operable device has completed its movement for either of the two-way operations so that the pressure in the lines of tubing will drop to zero and each pipe system will be rendered less vulnerable to loss of fluid so that when a break occurs in one of the pipe lines no fluid will be lost from the remainder of the systems; by which the selective controls are automatically returned to neutral position as soon as the hydraulic device has performed either of its two-way functions so that the lines are not pressure stressed except during the brief intervals necessary for the actual operation of the device; in which the actuating valves of the selectors are of the open-center type so that an unloading valve or accumulator outside of the selector-casing is not necessary for providing a free circulation of the fluid during the idle periods; in which pilot-members which require little force, control the manipulation of valves for high hydraulic pressures (sometimes in excess of 2000 p. s. i.) are used to control the high pressure for shifting the valves; which is compact for placement in relatively invulnerable locations on an airplane or where it can be protected by armor plate without increasing its dead weight load, and is adapted for electric remote control operation; in which the casing is of sectional construction so that the number of units in the selector mechanism may be increased or decreased according to the number of hydraulically operable devices which are to be controlled; which is simple in construction and efficient in operation. Other objects will appear from the detailed description.

The invention consists in the several novel features which are hereinafter set forth and more particularly defined by claims at the conclusion hereof.

In the drawings:

Fig. 1 is a front elevation of selector valve mechanism embodying the invention.

Fig. 2 is a horizontal section taken on line 2—2 of Fig. 1.

Fig. 5 is a view similar to Fig. 3 illustrating one control valve mechanism in the position assumed when fluid is being forced to and returned from a two-way connection for a hydraulically operable device.

Fig. 6 is a section taken on line 6—6 of Fig. 2.

Fig. 7 is a vertical section illustrating one of the pilot rods, and the ducts for fluid controlled by the rod, the rod being shown in its normal or neutral position.

Fig. 8 is a plan view of one of the sleeves for a pilot rod.

Fig. 9 is a horizontal section taken on line 9—9 of Fig. 7, the pilot rod being shown in elevation.

Fig. 10 is a plan view of the pilot rod sleeve which is connected to the port in the casing through which by-pass fluid flows to one of the ducts through which fluid is returned to the reservoir.

Fig. 11 is a diagram of the electrical connections for separately controlling each of the pilot rods.

Figure 3:
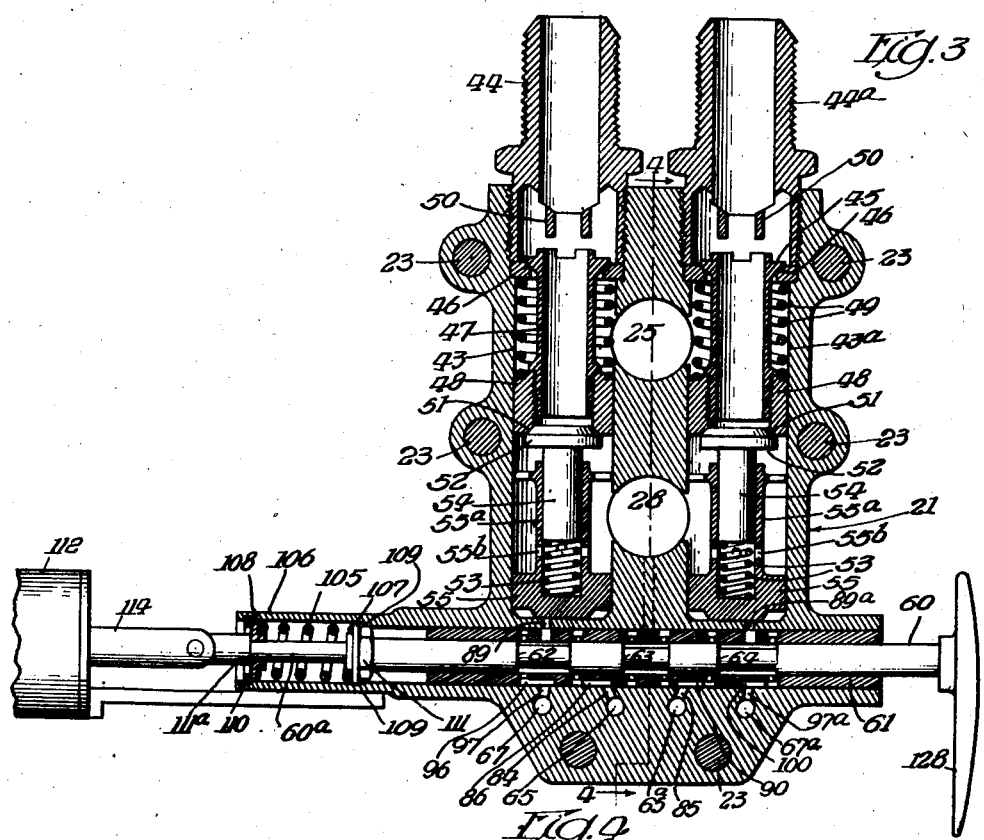
Fig. 3 is a sectional transverse section taken on line 3—3 of Fig. 2 showing one control valve mechanism in its normal position in which it cuts off the flow of fluid to and from a hydraulically operable device.

The invention is exemplified in a selector mechanism which comprises a series of units each of which is equipped with valves for individually controlling the flow of fluid, such as a suitable oil, for the actuation of a two-way hydraulic system. Any desired number of these units may be used for selective control of a corresponding number of two-way hydraulic systems. The invention is usable for the selective control of two-way pipe lines for hydraulically operable or control devices, such as are used in aircraft to raise and lower the landing gear, to open and close bomb-bay doors, for shifting landing flaps and for hydraulically operable devices used for other purposes. These devices may be of any suitable construction and usually include two pipe-line connections between the casing of the selector mechanism and the fluid-operable devices, which are well understood in the art, and therefore only the couplings 44, 44ᵃ in the casing for said connections have been illustrated.

The selector mechanism comprises a casing which is connected to continuously receive fluid under pressure directly from a pump or other constant fluid pressure supply, means for circulating the fluid from the pump to a reservoir while maintaining a predetermined pressure in the casing when the hydraulically operable devices are inactive, valves for delivering actuating fluid from the casing to one of the two-way pipe connections between the casing and the hydraulically operable device and for simultaneously returning fluid from the other of the two-way connections via the valve casing to the reservoir. The connections from the pump to the selector casing for fluid under pressure and the return fluid from the casing to the reservoir from which the pump is supplied are well understood in the art, and therefore only the coupling 24 which is connected to receive fluid under pressure from the pump, the coupling 29 for the connection which returns the fluid circulated through the casing when the hydraulic systems are inactive, and the coupling 27 which is also connected to the reservoir for the return fluid received by the casing from the hydraulically operable devices, are illustrated.

The casing for the selector mechanism is preferably built up of an end-section 20, an opposite end-section 22, and a series of intermediate sections 21. Each of the sections 20 and 21 is equipped with valves and control means of like construction, for selectively controlling one of the hydraulic systems. The side faces of all of said sections fit together in fluid-tight relation and are secured together in series by a series of through bolts 23. This sectional construction makes it possible to readily assemble units for any desired number of hydraulic systems by increase or diminution of the number of intermediate sections and is advantageous in removal and replacement for repair.

Figure 4:
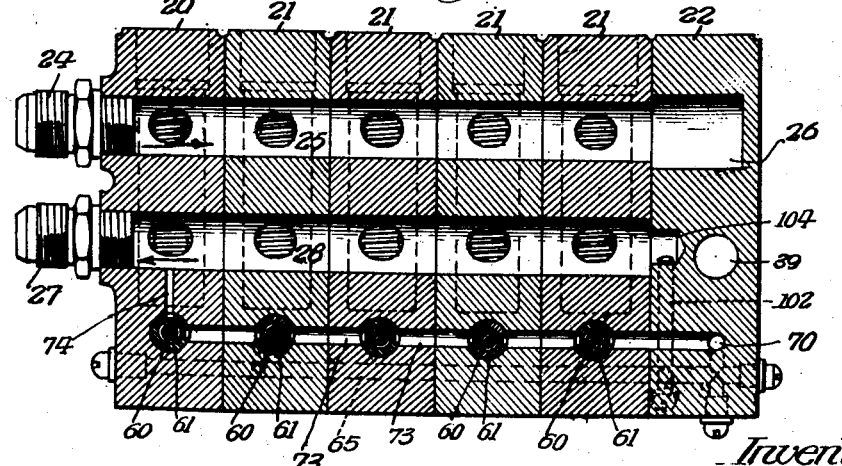
Fig. 4 is a vertical longitudinal section taken on line 4—4 of Fig. 3.

Coupling-nipple 24 for the connection to a fluid pump or other constant source of fluid under pressure, is screw-threaded into the casing-section 20 and communicates with and delivers fluid into a longitudinal cylindrical duct 25 (Fig. 4) which extends through end-section 20 and all of the intermediate sections 21 and to a chamber 26 in the end section 22. This duct 25 communicates with the valve-chambers in sections 20 and 21 for the delivery of actuating fluid via the valve-chambers in said sections, to the couplings 44, 44ª. Coupling-nipple 27 is screw-threaded into the end-section 20 and communicates with a longitudinally extending duct 28 which extends through and communicates with the valve-chambers in end-section 20 and all of the intermediate sections 21 for the return of fluid from the pipe line connections via the valve-chambers in said sections to the reservoir. Coupling 29 is screw-threaded into the back of end-section 22 of the casing, and the fluid during its circulation through the casing while the control valves are closed, passes through said coupling to the reservoir.

The chamber 26 in the casing-section 22, which communicates with longitudinal pressure duct 25, intersects and communicates with a cylindrical chamber 30 in said casing-section. The upper end of chamber 30 is closed by a screw-threaded cap 31 which is provided with a hollow and open-sided depending stem which is provided on its lower end with an annulus 33 which fits in the chamber 30 below the duct 25. A spring-loaded valve-member 35 is adapted to close against the seat 34. Valve-member 35 controls the flow of fluid from chamber 30 to cross duct 39 (Fig. 6) which communicates with the coupling 29. Valve-member 35 is on and slidably guided by a piston 36 which is fitted in a cylinder in the sleeve 38 which is fixed in the lower end of chamber 30. Valve-member 35 is urged against its seat 34 by a spring 40 confined in the lower end of piston 36. The upper end of sleeve 38 is cut away to permit fluid to pass through stem 32 into the cross duct 39 which is connected to the outlet coupling 29. When the valves for controlling the connections between the selector casing and the hydraulically operable devices are closed, the spring-loaded valve 34, 35 will maintain a predetermined pressure of the fluid in duct 25 and permit the excess to flow through the cross duct 39 and coupling 29 back to the reservoir. This exemplifies means in the selector-casing for maintaining a predetermined pressure of actuating fluid and circulating the excess of fluid from the pump to the reservoir.

Each of the casing-sections 20, 21 is provided with a pair of vertically extending parallel cylinders 43, 43ª at the front and rear of the longitudinal ducts 25 and 28, respectively. The upper portion of each of said cylinders is intersected by and in communication with the longitudinal pressure duct 25. The lower portion of each of the cylinders 43, 43ª is intersected by and in communication with the longitudinal return duct 28. A coupling-nipple 44 is screw-threaded into the upper end of each cylinder 43 and a coupling 44ª is screw-threaded into each cylinder 43ª. The couplings 44, 44ª on each casing-section serve as means for connection, respectively, to the pipe lines of a pair for the two-way operation of a hydraulically operable device.

Each of the cylinders 43, 43ª contains an upper valve for controlling the flow of actuating fluid from duct 25 to the couplings 44, 44ª, respectively, and a lower valve for controlling the return fluid, which passes through the associated upper valve, into the longitudinal return duct 28 via the lower portion of said cylinders. The valves in each pair of cylinders are alike in construction and operation and are adapted to function alternately to control the flow of actuating fluid to one and return fluid from the other of a pair of pipe connections between one section of the casing and one of the hydraulically operable devices.

The upper valve in each of the cylinders, 43, 43ª comprises a slidable valve-member 45 having a hollow depending stem 47, and a seat 46 for said member, which is fixed in the upper end of the surrounding cylinder, for controlling the outflow of actuating fluid from each of said cylinders, respectively. A piston 48, which is screw-threaded to the lower end of the hollow stem 47 on each member 45, fits and is slidable in the surrounding cylinder. Fixed stops 50 limit the upper movement of each valve member 45. Each valve member 45 controls the flow of actuating fluid from duct 25 via the upper portion of its surrounding cylinder to the coupling connected to said cylinder. The hollow stem 47 permits return fluid to pass through piston 48. A spring 49 between seat ring 46 and piston 48 normally presses each upper valve member 45 closed against its seat 46.

The lower valve in each of the cylinders 43, 43ª comprises a member 52 which is adapted to engage a seat 51 on the lower end of the piston 48 on the associated upper valve. Member 52 is provided with a stem 54 which is slidably guided in the tubular stem 55ª on a piston 55 which is slidable in the lower end of the surrounding cylinder 43 or 43ª. A spring 53 is applied between the piston 55 and the lower end of stem 54 to normally lift member 52 in the sleeve 55ª on piston 55, for closing member 52 against its seat 51. The upper end of the cylindrical stem 55ª on each piston 55 is provided with lugs by which it is guided in the surrounding cylinder and its lower end is provided with vents 55ᵇ to permit fluid to exhaust from the socket in which stem 54 is slidable when said stem is lowered in said piston. Normally, the force of spring 49 and the pressure of fluid against the upper end of piston 48 hold the valve member 52 closed and the piston 48 lowered. Normally, each valve member 45 is closed against seat 46 by the pressure of fluid against the upper end of its piston 48 and spring 49. Piston 55 is seated against the lower end of its surrounding cylinder, and spring 53 is effective to close valve-member 52 against its seat 51, as illustrated in Fig. 3. With both of the actuating valves and return valves closed, the fluid in the pressure duct 25 will be kept under predetermined pressure by the valve 35, 34, in casing-section 22 and the excess fluid will be returned around member 35 and through duct 39 and coupling 29 to the reservoir. Each valve 52, 51 functions to control the flow of return fluid which passes through the hollow stem 47 of the actuating valve above it, and the lower portion of the surrounding cylinder 43, 43ᵃ to the longitudinal return duct 28 for return to the reservoir.

Each piston 55 is shiftable by fluid under pressure delivered into the lower end of its surrounding cylinder by control means hereinafter described, to open the upper valve for controlling the delivery of actuating fluid to one of the pipe connections.

The area of the upper end of each piston 48 is greater than the exposed area of the under side of valve member 45 so that there will be a preponderating pressure for moving the piston 48 downwardly to close valve member 45 and normally hold the actuating valve closed. When the piston 55 of the lower valve is raised by fluid under pressure in the lower end of its cylinder, the actuating valve is positively opened and held open by the abutting engagement of the upper end of the hollow stem 55ᵃ of piston 55, valve-member 52 and seat 51 on piston 48 (cylinder 43 in Fig. 5). When the member 45 of the actuating valve is closed, the return fluid passes through stem 47 and unseats valve member 52 (cylinder 43ᵃ in Fig. 5).

When both actuating and return valves are closed, as illustrated in Fig. 3, there will be no fluid under pressure in the lower ends of cylinders 43, 43ᵃ for lifting the pistons 55. The opening of one of each pair of upper valves for the outflow of actuating fluid is controlled by fluid under pressure acting against the lower face of a piston 55 while the other of said upper valves remains closed, so that the return fluid will flow through the stem 47 of the latter valve and unseat valve member 52 to permit the return fluid to flow to the return duct 28.

The means for selectively controlling fluid to and from each associated pair of cylinders 43, 43ᵃ for the control of the valves therein comprises a pilot rod or valve-member 60 which is slidably mounted in a fixed sleeve 61. A rod 60 and a sleeve 61 are provided in each of the casing-sections 20 and 21. Each rod 60 controls the flow of fluid to and from the lower ends of one pair of cylinders 43, 43ᵃ for operating the pistons 55. Each pilot rod 60 is normally held in a centralized position (Fig. 3) by a coil spring 105 which is confined in a sleeve 106 which projects from one of the casing-sections. Each pilot rod 60 is shiftable forwardly from its neutral position to control one of the upper valves in the cylinders 43 for the outflow of actuating fluid from duct 25 to coupling 44 while the return fluid which enters the casing through coupling 44ᵃ flows via duct 28 to the reservoir. Each pilot rod 60 is also shiftable rearwardly from its neutral position to control the upper valve in the cylinder 43ᵃ for the outflow of actuating fluid through coupling 44ᵃ while the return fluid which enters the casing through coupling 44 flows via duct 28 to the reservoir. A spring 105 is confined between washers 107 and 108 on each rod 60, and normally engages a shoulder 109 on sleeve 106 and a ring 110 fixed in said sleeve, respectively. The stem 60ᵃ of rod 60 has an abutment 111ᵃ for compressing the spring 105 when rod 60 is moved forwardly while washer 107 engages shoulder 109. Said stem 60ᵃ also carries a nut 111 for engaging washer 107 and compressing the spring while washer 108 engages ring 110 when the rod 60 is moved rearwardly. This construction permits each of the rods 60 to be shifted in either direction from its neutral position to selectively control, by fluid under pressure, the upper valves in the cylinders 43, 43ᵃ and causes each rod 60 to be returned to its neutral position at the conclusion of each operation. Each rod 60 is held in either of its shifted positions by electric control mechanism hereinafter described and automatically released at the end of an actuating operation.

Each pilot rod 60 has a cylindrical periphery fitting in the bore of a sleeve 61 and is provided with annular grooves 62, 63 and 64. A vertical port 89 connects the lower end of each cylinder 43 with the bore of a sleeve 61. A port 89ᵃ connects the lower end of each cylinder 43ᵃ with the bore of a sleeve 61. Each annular groove 62 and the cylindrical portions of rod 60 at the ends of said groove, control the flow of fluid via port 89 to and from the lower end of a cylinder 43. Each annular groove 64 and the associated cylindrical portions of rod 60 at the ends of said groove, control the flow of fluid via port 89ᵃ to and from the lower end of cylinder 43ᵃ. The annular groove 63 and the portions of rod 60 adjacent its ends, permit the return of fluid to the longitudinal return duct 28, when the actuating and return valves are in their normal position.

A restricted flow of fluid from the upper portion of cylinder 30, which communicates with the pressure duct 26 in casing-section 22 (Fig. 6), is used for shifting, under control of the pilot rods 60, the pistons 55 in the lower ends of cylinders 43, 43ᵃ. The piston 36 on the valve member 35 (Fig. 6) in casing-section 22 is provided with a restricted orifice 69 which permits a limited flow of fluid under pressure to a cross duct 70 which communicates with the longitudinal duct 73 for returning the by-pass fluid to the return duct 28, and to the longitudinal ducts 65 and 65ᵃ, for delivering said fluid under control of the pilot rods 60, for the operation of the pistons 55. This fluid passes through a nipple 71 and a strainer 72 which are secured in the upper end of valve member 35. The fixed sleeve 38 in which the piston 36 on valve member 35 is slidable, has cut-away portions in its lower end, to permit the fluid to pass to the cross duct 70.

Duct 65 extends longitudinally of the casing, receives fluid from cross duct 70, and is connected by a port 84 to the bore of each of the sleeves 61, for supplying fluid under pressure to the lower end of each of the cylinders 43; duct 65ᵃ extends longitudinally of the casing, receives fluid from cross duct 70 and is connected to each of the sleeves 61 by a port 85, for supplying fluid under pressure to the lower end of the cylinders 43ᵃ. A longitudinal duct 67 is connected by a port 97 to each of the sleeves 61, for exhausting fluid from the cylinders 43, and a longitudinally extending duct 67ᵃ is connected by a port 97ᵃ to each of the sleeves 61, for exhausting fluid from the cylinders 43ᵃ. The ends of the longitudinal exhaust ducts 67, 67ᵃ are connected, in casing-section 22, by diagonal ports 102 to a recess 104 which communicates with one end of the return duct 28.

Each sleeve 61 is provided on its outer periphery with a longitudinal channel 86 which is in communication with a port 84, an annular groove 87 communicating with channel 86, and a series of radial ports 88 which, when said radial ports are unblocked by the forward movement of the rod 60 from its neutral position, permit fluid under pressure to flow from longitudinal duct 65, via port 84, channel 86, ports 88, annular groove 62 in rod 60, and port 89 to the lower end of cylinder 43 for lifting the piston 55 therein. Each sleeve 61 is also provided with a longitudinal channel 90, an annular groove 92 and radial ports 91 which, when they are unblocked by the rearward movement of the pilot rod 60 from its neutral position, will permit fluid under pressure to flow from duct 65ᵃ, via port 85, channel 90, groove 92, radial ports 91, the annular groove 64 in rod 60, and port 89ᵃ, to the lower end of a cylinder 43ᵃ.

Each sleeve 61 is also provided with a longitudinally extending channel 96, an annular groove 95 and radial ports 94, which when the rod 60 is in its neutral position (Fig. 7), will permit fluid in the lower end of cylinder 43 to exhaust via port 89, channel 62 in rod 60, radial ports 94, annular groove 95, longitudinal channel 96, and port 97, to the longitudinal return duct 67. When rod 60 is moved forwardly from its neutral position it will block the exhaust from cylinder 43 at the radial ports 94. Each sleeve 61 is also provided with a longitudinal channel 100, an annular groove 99, and radial ports 98 which, when the rod 60 is in its neutral position, will permit fluid from cylinder 43ᵃ to exhaust via port 89ᵃ, channel 64 in rod 60, radial ports 98, annular groove 99, longitudinal channel 100, and ports 97ᵃ to the longitudinal return duct 67ᵃ.

When pilot rod 60 is in its neutral position it will unblock radial ports 94 and 98 so that fluid from the lower ends of both cylinders 43, 43ᵃ will exhaust to longitudinal ducts 67, 67ᵃ, respectively, and said rod will block the flow of fluid under pressure to the cylinders 43, 43ᵃ at radial ports 88 and 91, respectively. When rod 60 is moved forwardly or to the right, it will cut off the exhaust of fluid from cylinder 43 at radial ports 94 and uncover the radial ports 88 so that fluid under pressure will flow from duct 65 into the lower end of cylinder 43 to raise the piston 55 therein. When the pilot rod 60 has been thus shifted, radial ports 98 will remain unblocked by the rod for the exhaust of fluid from the lower end of cylinder 43ᵃ to longitudinal return duct 67ᵃ.

When the pilot rod 60 is shifted inwardly or rearwardly it will unblock the radial ports 91 so that fluid under pressure will flow from longitudinal duct 65ᵃ to the lower end of cylinder 43ᵃ and simultaneously block the radial ports 98 to prevent exhaust of the fluid from said cylinder to longitudinal return duct 67ᵃ. In this shifted position of pilot rod 60, the exhaust connection from the lower end of cylinder 43 to return duct 67 will remain open.

Fluid which is by-passed in restricted volume from that under pressure in cylindrical chamber 30 in casing-section 22, flows via duct 70 to the longitudinal ducts 65, 65ᵃ for shifting the pistons 55 in cylinders 43, 43ᵃ. The by-pass fluid also flows from duct 70 into a duct 73 which extends longitudinally through the casing-sections 21, is intersected by the fixed sleeves 61, and terminates at one side of the sleeve 61 in the casing-section 20.

The sleeves 61 in the casing-sections 20, 21 are adapted to permit the fluid in duct 73 to flow to the return duct 28, when the pilot rods are in their neutral position. The sleeves in each section 21 are provided for this purpose with a longitudinal channel 75 which communicates with the duct 73 at one side of the sleeve, an annular groove 76, radial ports 77, which communicate with the annular groove 63 in rod 60, radial ports 78, an annular groove 79, and a longitudinally extending channel 80 on the opposite side of the sleeve which communicates with the continuation of the duct 73. The sleeve 61 in casing-section 20 is similarly provided with a channel 75, groove 76, radial ports 77, 78, an annular groove 79, and a longitudinally extending channel 81 (Fig. 10) which communicates with a vertical port 74 (Fig. 4) through which the fluid can flow into the longitudinal return duct 28. When the pilot rods are in their neutral position, the fluid from orifice 69 will flow into the end of duct 73 in the casing-section 22 successively through the channel grooves and ports in the sleeves 61, the associated grooves 63 in the pilot rods, to the duct 74 to the return duct 28. When one of the pilot rods 60 is shifted, either forwardly or backwardly from its neutral position, it will block the flow of the by-pass fluid to the return duct 74 by blocking the radial ports 77 or 78, respectively. This blocking will create a back pressure in the sections of the duct 73 between the shifted pilot rod and the casing-section 22 and in the longitudinal ducts 65, 65ᵃ for the operation of pistons 55.

While all of the pilot rods are in their neutral position, the flow of the fluid in longitudinal ducts 65, 65ᵃ to cylinders 43 is blocked at the radial ports 88, and to cylinders 43ᵃ at the radial ports 91; the lower end of cylinder 43 can exhaust through ports 89, radial ports 94, groove 95, channel 96, port 97, and exhaust duct 67; and fluid in the lower end of cylinder 43ᵃ can exhaust through ports 89ᵃ, radial ports 98, groove 99, channel 100, port 97ᵃ, and exhaust duct 67ᵃ.

When a pilot rod 60 is shifted forwardly or to the right, it will block the flow of fluid in the duct 73 to the return duct 28 at the radial ports 77 to create back pressure in the longitudinal ducts 65 and 65ᵃ; block the exhaust of fluid from cylinder 43 at radial ports 94; permit fluid under pressure to flow from duct 65 through a port 84, channel 86, groove 87, radial ports 88, groove 62 in the pilot rod, and port 89 to the lower end of cylinder 43 for opening the actuating valve in said cylinder; block the flow of fluid from duct 65ᵃ to cylinder 43ᵃ at the radial port 91; and leave the lower end of the cylinder 43ᵃ open to exhaust through port 89ᵃ, groove 64 in rod 60, radial ports 98, groove 99, channel 100, and port 97ᵃ to duct 67ᵃ.

When a pilot rod 60 is shifted rearwardly or to the left, it will block the flow of fluid in the duct 73 to the return duct 28 at the radial ports 78 to create back pressure in the longitudinal ducts 65 and 65ᵃ; block the exhaust of fluid from cylinder 43ᵃ at radial ports 98; permit fluid under pressure to flow from duct 65ᵃ through a port 85, channel 90, groove 92, radial ports 91, groove 64 in the pilot rod, and port 89ᵃ to the lower end of cylinder 43ᵃ for opening the actuating valve in said cylinder; block the flow of fluid from duct 65 to cylinder 43 at the radial port 88; and leave the lower end of the cylinder 43 open to exhaust through port 89, groove 62 in rod 60, radial ports 94, groove 95, channel 96, and port 97 to duct 67.

In practice, it is advantageous to control the shift of the pilot rods so they will be automatically retracted to neutral position at the end of either of the two-way operations of the hydraulic system and discontinue the delivery of actuating fluid under pressure to said system, and the pipe lines will not be kept under actuating pressure after the device has been shifted to either of its alternate positions. Each pilot rod 60 is shiftable inwardly and outwardly from its neutral position, respectively, by suitably wound shifting coils 112, 113 of a solenoid magnet, the armature 114 of which is operatively connected to the rear end of the stem 60ᵃ of the rod. While the coil 112 is energized it will hold the armature 114 and the pilot rod 60 outwardly or forwardly for control of the valves in the casing-section in which the shifted pilot rod is mounted, to deliver fluid under pressure to one of the cylinders 43 from duct 25 to and through the coupling 44 and simultaneously control the flow of the return oil from the coupling 44ᵃ via cylinder 43ᵃ, to the return duct 28. When the coil 113 is energized, the pilot rod 60 connected thereto will be shifted rearwardly and there held to control the valves in that casing-section in which the pilot rod is mounted, so that fluid under pressure will flow from duct 25 to and through coupling 44ᵃ and return fluid can pass from coupling 44 to the return duct 28. Means are provided for interrupting the circuits for holding coils 112, 113 as soon as the hydraulically operable system has completed either of its two-way functions. A manually operable switch lever 115 is provided for controlling the movements of each pilot rod 60 by the coils 112, 113. Each lever 115 is normally held in its centralized or neutral position by a spring 116 and is shiftable to selectively close circuits for the two-way operation of the hydraulic device for completing its function in either direction. The means for thus controlling the coils 112, 113 comprises a battery 117 which has one of its poles connected to contacts 118 and 119 and its other pole connected for energizing the coils 112 and 113; a pair of contacts 120, 121 engageable by the lever 115 for closing a circuit from the battery to energize the coils 112 and 113; an electromagnet 124 for holding the lever 115 engaged with contacts 118, 120 and which is controlled by a limit-switch 126 which is associated with the hydraulically operable device and operable at the end of a one-way actuation, and an electromagnet 125 for holding the lever 115 engaged with contacts 119, 121, for energizing the coil 113 which is controlled by a limit switch 127 associated with and operable at the end of the other actuation by the hydraulically operable device. When the lever 115 has been shifted to energize coil 112, holding coil 124 will hold the lever to keep the circuit for said coil closed until the limit switch 126 is opened. When lever 115 is shifted to close the circuit for shifting coil 113, the lever will be held to close the circuit for said coil by magnet 125 until the limit switch 127 is opened. As soon as either limit switch is opened, the spring 116 will shift the lever 115 to its neutral position so that the coil 112, 113 will be deenergized which will permit the centralized spring 105 to return the shifted pilot rod 60 to its neutral position as soon as the hydraulic device has performed either of its two-way functions. In this manner the pipe lines between the selector and the hydraulically operable devices are relieved of the stresses of actuating pressure except during the brief periods in which the shifting of said devices occurs. In practice it is advantageous to place the selector in a relatively invulnerable location on the airplane where it is least exposed to gunfire. The electrical control for the pilot rods may be remotely located from the selector within reach of the pilot. A handle 128 is connected to the front end of each pilot rod 60 so that it can be manually shifted in the event that the electric control for the pilot rod should fail or become inoperative.

The operation of each of the units of the selector for controlling the two-way operation of one of the hydraulically operable devices will be the same.

The operation of each unit will be as follows: Normally, the pilot rods 60 are spring-held in their centralized position, the valve members 45 and 52 in both of the cylinders 43, 43ᵃ in each of the casing-sections 20 and 21 will be closed, as illustrated in Fig. 3, and the residual fluid will be retained, without actuating pressure, in the pipes connected to the couplings 44, 44ᵃ. Fluid will be constantly delivered by the pump, through coupling 24 into the longitudinal duct 25 and the upper portions of the cylinders 43, 43ᵃ. Valve members 45 in both cylinders 43, 43ᵃ will be held closed by springs 49. Valve members 52 will be held closed by springs 53. No fluid from pressure duct 25 will then flow to the couplings 44, 44ᵃ or through the cylinders 43, 43ᵃ to the return duct 28. A relatively low predetermined pressure will be maintained in duct 25 and the upper portion of cylinders 43, 43ᵃ by the spring-loaded valve member 35 in the casing-section 22. The excess fluid will flow from cylindrical chamber 30 in casing-section 22, around valve member 35, and through cross-duct 39, to the coupling 29 which is connected to the reservoir. Some of the fluid will constantly flow through the restricted orifice 69 in the piston 36 of valve-member 35 to cross-port 70 and into the longitudinal ducts 65, 65ᵃ and the duct 70 which intersects the sleeve 61. The flow of fluid from ducts 65 to cylinders 43 will then be blocked at radial ports 88 by the pilot rods 60. The flow of fluid from duct 65ᵃ to cylinders 43ᵃ will then be blocked at radial ports 91 by the pilot rods 60 so that there will be no pressure acting on the pistons 55 in the lower ends of cylinders 43, 43ᵃ. From cross-duct 70 in casing-section 22 some of the fluid from orifice 69 will also flow into the longitudinal duct 73 and successively through all of the sleeves 61 and grooves 63 in the pilot rods 60 to the longitudinal channel 81 in the sleeve 61 in casing-section 20, from which it will be returned through duct 74, the return duct 28 and coupling 27 to the reservoir. The lower end of cylinders 43 will be open for the exhaust of fluid through ports 89, annular grooves 62 in the pilot rods, radial ports 94, channels 96, ports 97, and one of the diagonal ports 102 in casing-section 22, chamber 104 and the return duct 28. The lower end of the cylinders 43ᵃ will be open to exhaust fluid through ports 89ᵃ, grooves 64 in rods 60, radial ports 98, annular groove 99, longitudinal channels 100, ports 97ᵃ, ducts 67ᵃ, one of the diagonal ports 102 and chamber 104 to the return duct 28.

When one of the hydraulically operable devices is to be selectively actuated by fluid under pressure through coupling 44, the pilot will shift the associated switch lever 115 to engage contacts 118, 120 and 123. A circuit will be established from battery 117 through coil 112, contact 120, switch lever 115 and contact 118 for energizing said coil and holding the pilot rod 60 in its outward or forward position. The energized holding coil 124 will retain switch lever 115 in its closed position until the limit-switch 126 is opened at the completion of the one-way shifting operation of the hydraulically controlled device.

This outward movement of pilot rod 60 will block the fluid from orifice 69 in piston 36, at radial ports 77 in sleeve 61 at the shifted pilot rod and prevent the return of said fluid through the continuation of duct 73 and port 74 to the return duct 28 which will cause a back pressure to be produced in the chamber 30 below piston 36, forcing the latter upwardly until the valve 35 seats. Valve 35 is thereafter held against its seat 34 by the differential hydraulic pressure resulting from the fact that the cross-sectional area of the piston 36 which is acted upon by the fluid in the bottom of the chamber 30 is greater than the area of the valve 35 which is acted upon by the fluid in the top of the chamber 30. The closing of the valve 35 causes the pressure in the top of chamber 30 and in the passageway 25 to build up almost instantly to the full operating pressure of the system. At the same time, the pressure in the bottom of the chamber 30 and in passageways 73, 65 and 65ª is also built up to the full operating pressure by reason of the passageway 69 in piston 36. The flow of fluid from the duct 65ª to cylinder 43ª is then blocked at the radial ports 91 by the shifted pilot rod to prevent fluid under pressure from passing into the lower end of cylinder 43ª. The lower end of cylinder 43ª remains open to exhaust via radial ports 98, annular groove 99, channel 100, port 97ª, and duct 67ª. The pilot rod will then also block the radial ports 94 and prevent exhaust of fluid from cylinder 43. The fluid under pressure from duct 65 will then flow via port 84, channel 86, annular groove 87, radial ports 88, groove 62 in the shifted pilot rod 60 and port 89 to the lower end of cylinder 43, and will lift the piston 55 in said cylinder so that the upper end of stem 55ª will engage valve member 52 against its seat 51 and lift piston 48 and its stem 47 to open the valve member 45. Fluid under pressure from duct 25 will then flow around stem 47 and valve member 45 to the coupling 44 for delivering actuating fluid for one-way operation of the hydraulic device. The valve member 45 in the cylinder 43ª will be held closed by its spring 49 and fluid pressure against the upper end of its piston 48. The piston 55 in the cylinder 43ª will remain lowered and the return fluid entering the casing through coupling 44ª from the hydraulic device flowing through the hollow stem 47 will open the valve member 52 and permit the return fluid to flow into the lower portion of the cylinder 43ª to the return duct 28.

When the device has been hydraulically shifted by actuating fluid from coupling 44, the limit-switch 126 will be opened by or under control of the device, and open the circuit through the holding coil 124 so that lever 115 will be free to be shifted to its neutral position by the spring 116. The spring 105 will then return the pilot rod which has been shifted to its neutral position. The return of the pilot rod to its neutral position will restore the channels 62, 63, and 64 to the neutral position illustrated in full lines in Fig. 7. Fluid in the lower end of cylinder 43 will then exhaust through port 89, channel 62 in rod 60, radial ports 94, annular groove 95, longitudinal channel 96, port 97, longitudinal duct 67, diagonal port 102 (Fig. 6) to the return duct 28, and the pressure under the piston 55 in cylinder 43 will be blocked at radial ports 88. Spring 49 and the pressure against piston 48 will close the actuating valve which was opened, and as soon as the pressure in the return fluid passing through coupling 44ª is discontinued, spring 53 will close valve member 52 against its seat 51. Both of the actuating valves and the return valves will then be closed as illustrated in Fig. 3 and will remain closed until one of the pilot rods is operated. The by-pass fluid in the duct 73 will then flow successively around the sleeve 61 to port 74 and the return longitudinal duct 28.

When the hydraulically operable device is to be reversely shifted, the pilot will shift the switch lever 115 to engage contacts 119, 121 and 122 which will establish a circuit for energizing the coil 113 and holding coil 125 which will hold said lever in its shifted position until the limit-switch 127 is opened by the hydraulic device. The coil 113 will shift the pilot rod 60 inwardly, which will block the flow of by-pass fluid in the longitudinal duct at the radial ports 98 and cause a back pressure to be built up in the longitudinal duct 65ª; will block radial ports 98 to prevent exhaust from cylinder 43ª; will unblock the radial ports 91 so that fluid under pressure will flow from duct 65ª through port 85, channel 90, groove 92, radial ports 91, channel 64, and port 89ª into the lower end of the cylinder 43ª to shift piston 55 and open the valve member 45ª to shift piston 55 and open the valve member 45 in said cylinder 43ª for the flow of actuating fluid through coupling 44ª for the reverse operation of the hydraulic system; and will block radial ports 88 to prevent flow from longitudinal duct 65 to the cylinder 43. The valve 45, 46 in cylinder 43ª will then function to deliver actuating fluid through coupling 44ª to the hydraulic system, and the valves in the cylinder 43 will function to deliver the fluid returned from the system through coupling 44 to the duct 28. When the hydraulic device has completed its reverse operation, the limit-switch 127 will be opened to interrupt the circuit through the holding coil 125 and switch lever 115 will be released for shift to its normal position by the spring 116. Coil 113 will then be deenergized and the spring 105 will restore the shifted pilot rod to its neutral position which will cause the valves in both of the cylinders 43 and 43ª to be restored to normal position as before described, to retain the fluid in both pipe lines of the two-way connection, and to cause the fluid to be circulated through the casing and the coupling 29 to the reservoir, as before described.

The invention exemplifies selector valve mechanism which is constructed and arranged so that any leakage past the valves will not impair its functioning and so that the volumetric increase of the fluid in the lines between the selector valve mechanism and the hydraulically operable device due to thermal expansion is vented off through return valves in the casing. In the event of leakage past the valves either during operation of the shifting mechanism or caused by volumetric increase of the fluid in the lines due to thermal expansion, it passes around one of the return valve members 52 into the passages for returning the fluid to the reservoir.

The invention exemplifies control mechanism for the pilot rods which is automatically reset to neutral position at the end of each actuating operation independently of the operator or pilot and it is impossible to leave the hydraulically operable system in on or off position after each shifting operation has been completed. This reduces the periods during which the tubing between the valve mechanism and the hydraulically operable device is subjected to actuating pressure stresses which may frequently cause premature failure of the lines, and reduces the stresses to the brief periods of the shifting operations.

The invention also exemplifies selector mechanism in which the circulation of the operating fluid under predetermined pressure through the valve casing is controlled by a spring-loaded valve in the end section 22 of the casing, which makes it unnecessary to provide an unloading valve or accumulator between the pump and the fluid reservoir and is necessary for relieving the excess fluid in the accumulator line.

The invention exemplifies control mechanism in which pilot rods or pistons and the ducts controlled thereby described render their shift exceptionally easy because they merely control the flow of by-passed fluid and do not necessitate a sufficient force to overcome the fluid pressure. This renders it possible to manipulate the controls electromagnetically or manually with finger-tip ease. In hydraulic systems used in aircraft, the pressure sometimes exceeds 2000 lbs. per square inch.

The invention exemplifies a construction in which each of the intermediate casing sections and the valve mechanism therein constitute a unit for the selective two-way operation of a hydraulically operative device. Sections 21 are identical in construction and the inlet and outlet couplings 24 and 27 are connected to the end-section 20 and the return coupling 29 is connected to the opposite end section 22 which contains the pressure controlling valve. This makes it possible to assemble any desired number of intermediate units between the end-sections. The number of units between the end sections 20 and 22 may be extended to provide for the control of any desired number of hydraulically operable devices on an airplane and units can be readily substituted in the event repair is necessary in any of the sections. The handles 128 in the pilot rods make it possible to control the selector valve mechanism in the event that the automatic control becomes inoperative.

The invention exemplifies selector mechanism which is compact, and adapted for electrical remote control so that it can be located in a relatively invulnerable position on the airplane or can be protected by armor plate without unduly increasing the dead weight load.

Having thus described the invention, what I claim as new and desire to secure by Letters Patent is:

1. Mechanism for selectively and hydraulically controlling a plurality of two-way hydraulic systems, comprising: a plurality of like units for individually controlling the systems, respectively, each unit comprising a casing section adapted to mate with the casing section of another unit, a pair of parallel cylindrical chambers, substantially parallel pressure and return ducts extending through the casing section between and communicatively intersecting the cylindrical chambers, a slidable piston and valve in each cylindrical chamber for controlling the flow of actuating fluid from the pressure duct to the respective system, a slidable valve and piston in each of the cylindrical chambers for controlling the flow of fluid from said system to the return duct, means for conducting fluid from the pressure duct to each of the cylindrical chambers, means for conducting fluid from each of the cylindrical chambers to the return duct, a pilot valve in the casing movable between a neutral position and two actuating positions and being provided with means for controlling flow through each of said fluid conducting means, a by-pass through the casing for fluid from the first-mentioned fluid conducting means, and means controlled by the pilot valve for opening said by-pass when the pilot valve is in neutral position and for closing the by-pass and building up pressure in the fluid to the pilot valve when the pilot valve is shifted to an actuating position.

2. Mechanism for selectively and hydraulically controlling a plurality of two-way hydraulic systems, comprising: a plurality of like units for individually controlling the systems, respectively, each unit comprising a casing section adapted to mate with the casing section of another unit, a pair of parallel cylindrical chambers, substantially parallel pressure and return ducts extending through the casing section between and communicatively intersecting the cylindrical chambers, a slidable piston and valve in each cylindrical chamber for controlling the flow of actuating fluid from the pressure duct to the respective system, a piston in each cylindrical chamber carrying a spring-pressed valve and piston in each of the cylindrical chambers for controlling the flow of fluid from said system to the return duct, means for conducting fluid from the pressure duct to each of the cylindrical chambers, means for conducting fluid from each of the cylindrical chambers to the return duct, a pilot valve in the casing movable between a neutral position and two actuating positions and being provided with means for controlling flow through each of said fluid conducting means, a by-pass through the casing for fluid from the first-mentioned fluid conducting means, and means controlled by the pilot valve for opening said by-pass when the pilot valve is in neutral position and for closing the by-pass and building up pressure in the fluid to the pilot valve when the pilot valve is shifted to an actuating position.

CARLOS B. LIVERS.

REFERENCES CITED

The following references are of record in the file of this patent:

UNITED STATES PATENTS

| Number | Name | Date |
| --- | --- | --- |
| 2,209,418 | Overbeke | July 30, 1940 |
| 1,566,111 | Miller | Dec. 15, 1925 |
| 1,927,700 | Dickinson | Sept. 19, 1933 |
| 2,324,690 | Gardiner | July 20, 1943 |
| 2,051,137 | Galleher | Aug. 18, 1936 |

FOREIGN PATENTS

| Number | Country | Date |
| --- | --- | --- |
| 515,617 | Great Britain | Dec. 11, 1939 |